(12) United States Patent
Peng et al.

(10) Patent No.: US 11,319,230 B2
(45) Date of Patent: May 3, 2022

(54) METHOD AND APPARATUS FOR TREATING MUNICIPAL SEWAGE BY AOA PROCESS VIA ENDOGENOUS PARTIAL DENITRIFICATION COUPLED WITH ANAMMOX IN ANOXIC ZONE

(71) Applicant: BEIJING UNIVERSITY OF TECHNOLOGY, Beijing (CN)

(72) Inventors: Yongzhen Peng, Beijing (CN); Xinjie Gao, Beijing (CN); Zaizhou Xu, Beijing (CN); Xiyao Li, Beijing (CN); Qiong Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 17/041,365

(22) PCT Filed: Apr. 2, 2020

(86) PCT No.: PCT/CN2020/082893
§ 371 (c)(1),
(2) Date: Sep. 24, 2020

(87) PCT Pub. No.: WO2020/220922
PCT Pub. Date: Nov. 5, 2020

(65) Prior Publication Data
US 2021/0246057 A1 Aug. 12, 2021

(30) Foreign Application Priority Data
Apr. 30, 2019 (CN) .......................... 201910358952.3

(51) Int. Cl.
*C02F 3/30* (2006.01)
(52) U.S. Cl.
CPC .............. *C02F 3/307* (2013.01); *C02F 3/305* (2013.01); *C02F 2203/006* (2013.01);
(Continued)

(58) Field of Classification Search
CPC ................ C02F 3/307; C02F 2203/006; C02F 2209/14; C02F 2209/16; C02F 2301/046; C02F 3/305
(Continued)

(56) References Cited

U.S. PATENT DOCUMENTS

2009/0272689 A1* 11/2009 Ladouceur ................ C02F 3/04
210/615
2013/0270182 A1* 10/2013 Tharp ..................... C02F 3/109
210/615
(Continued)

FOREIGN PATENT DOCUMENTS

| CN | 105217786 | 1/2016 |
|----|-----------|--------|
| CN | 105753153 | 7/2016 |

(Continued)

OTHER PUBLICATIONS

PCT International Search Report, issued in connection to patent application No. PCT/CN2020/082893; dated Jun. 8, 2020; 8 pages; China.

(Continued)

*Primary Examiner* — Fred Prince
(74) *Attorney, Agent, or Firm* — Greenberg Traurig, LLP

(57) ABSTRACT

An apparatus for treating municipal sewage by anaerobic/aerobic/anoxic (AOA) [1] process via simultaneous endogenous partial [2] denitrification coupled with anammox in anoxic zone is disclosed. The apparatus mainly includes a raw water tank (1) for sewage, an AOA reactor (2) and a sedimentation tank (3), the sludge flows back from the bottom of the sedimentation tank (3) to the anoxic zone (2.4) and the anaerobic zone (2.2) respectively, and biofilm filler is added to the anoxic zone (2.4). The sewage enters the (Continued)

AOA reactor (2), and the intracellular carbon source is stored in the anaerobic zone (2.2) to remove the organic matter in the raw water. Then it enters the aerobic zone (2.3) for nitrification, and the generated nitrate-nitrogen enters the anoxic zone (2.4) for endogenous partial denitrification. The filler in the anoxic zone (2.4) uses the generated nitrite-nitrogen by endogenous partial denitrification and the remaining ammonia-nitrogen in the raw water to perform anammox reaction. The generated nitrate-nitrogen can be further removed by endogenous denitrification in the anoxic zone (2.4). Endogenous partial denitrification coupled with anammox is used for nitrogen removal in the anoxic zone (2.4), which can reduce the requirement of aeration in the aerobic zone (2.3) and the carbon sources in the anoxic zone (2.4), and suitable for low C/N ratio municipal sewage treatment. A method for treating municipal sewage by AOA process via endogenous partial denitrification coupled with anammox in anoxic zone is also provided.

1 Claim, 1 Drawing Sheet

(52) U.S. Cl.
CPC ...... *C02F 2209/14* (2013.01); *C02F 2209/16* (2013.01); *C02F 2301/046* (2013.01)

(58) Field of Classification Search
USPC .......................... 210/605, 615, 630, 259, 903
See application file for complete search history.

(56) References Cited

U.S. PATENT DOCUMENTS

2014/0367330 A1* 12/2014 Liu .................. C02F 3/303
 210/605
2019/0092665 A1* 3/2019 Reid .................. C02F 3/307

FOREIGN PATENT DOCUMENTS

| | | |
|---|---|---|
| CN | 106830324 | 6/2017 |
| CN | 106938863 | 7/2017 |
| CN | 107032488 | 8/2017 |
| CN | 109354191 | 2/2019 |
| CN | 109368791 | 2/2019 |
| CN | 109368792 | 2/2019 |
| CN | 110015757 | 7/2019 |
| JP | 6491056 | 3/2019 |

OTHER PUBLICATIONS

PCT Written Opinon of the International Searching Authority, issued in connection to patent application No. PCT/CN2020/082893; dated Jun. 8, 2020; 10 pages; China.

\* cited by examiner

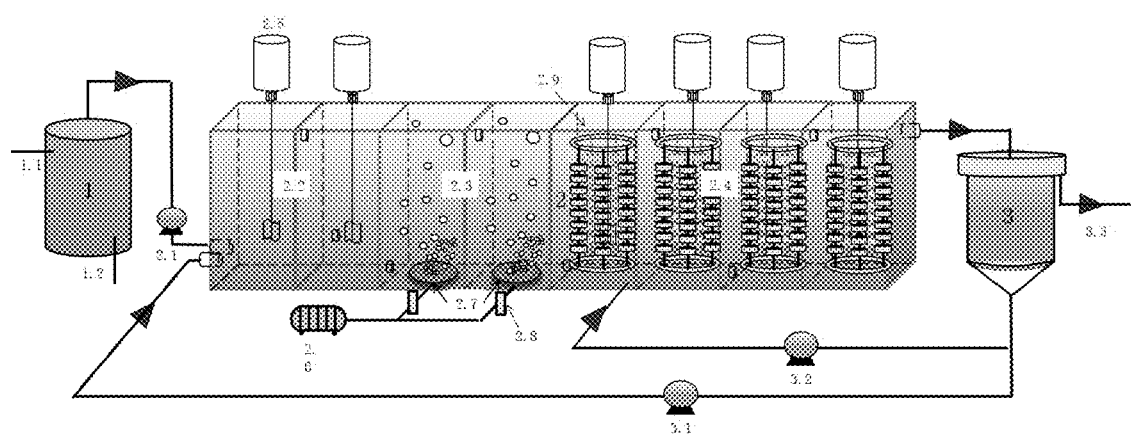

METHOD AND APPARATUS FOR TREATING MUNICIPAL SEWAGE BY AOA PROCESS VIA ENDOGENOUS PARTIAL DENITRIFICATION COUPLED WITH ANAMMOX IN ANOXIC ZONE

RELATED APPLICATIONS

This application is a national phase filing under 35 USC 371 of International Application No. PCT/CN2020/082893, filed on Apr. 2, 2020, which claims priority of Chinese Patent Application No. 201910358952.3, filed on Apr. 30, 2019, the entirety of which are incorporated herein by reference for all purposes.

TECHNICAL FIELD

The present invention belongs to the field of municipal sewage treatment and regeneration, and particularly relates to a method and an apparatus for treating municipal sewage by AOA process via endogenous partial denitrification coupled with anammox in anoxic zone.

BACKGROUND

With the rapid development of human economy, environmental pollution has become increasingly serious. The water pollution has become more and more serious, especially the eutrophication phenomenon of the water caused by nitrogen and phosphorus has seriously affected the life of people. At present, effectively removing nitrogen from sewage with a low C/N ratio and meeting the increasingly stringent quality standards of wastewater treatment plants (WWTPs) are the main challenges faced by sewage treatment plants.

As a common treatment process in the field of sewage treatment, AAO process also faces these challenges. Therefore, it is of great significance to optimize or modify the AAO process to achieve the advantages of low C/N ratio sewage nitrogen removal. Anammox has been widely studied as an autotrophic nitrogen removal technology. Anammox is an autotrophic biological denitrification process in which ammonia-nitrogen is used as an electron donor and nitrite-nitrogen is used as an electron acceptor to convert two kinds of nitrogen into nitrogen gas and part of nitrate-nitrogen. This process can achieve partial removal of nitrogen in sewage without organic matter. Anammox requires a stable nitrite-nitrogen source and partial denitrification is a process in which denitrifying bacteria reduce nitrate-nitrogen to nitrite-nitrogen under anoxic conditions, which can provide nitrite-nitrogen for the anammox reaction. Part of ammonia-nitrogen removed by anammox can effectively reduce aeration and carbon source, which is suitable for municipal sewage with low C/N ratio.

Based on the above, a method and an apparatus for treating municipal sewage by sludge double reflux-AOA via endogenous partial denitrification coupled with anammox is provided. The intracellular carbon source is stored in the anaerobic zone, organic matter in the raw water is fully utilized, and nitrification is performed in the aerobic zone to remove part of ammonia-nitrogen in the raw water, and the intracellular carbon source is further used in the anoxic zone for endogenous partial denitrification to convert nitrate-nitrogen into nitrite-nitrogen to provide a substrate for anammox, and meanwhile the purpose of advanced nitrogen removal is achieved by utilizing anammox bacteria on the filler, and resources are efficiently utilized.

SUMMARY

The purpose of the present invention is to provide a method and an apparatus for treating municipal sewage by AOA (anaerobic/aerobic/anoxic) process via endogenous partial denitrification coupled with anammox in anoxic zone, for advanced nitrogen removal of municipal sewage with low C/N ratio. In this apparatus, municipal sewage first enters an anaerobic zone of an AOA reactor from an raw water tank, glycogen-accumulating organisms (GAOs) in the anaerobic zone use organic matter in the sewage to synthesize glycogen and PHA to remove organic matter, and then a mixed liquid from the anaerobic zone enters the aerobic zone to carry out nitrification reaction to remove part of ammonia-nitrogen, and finally enters the anoxic zone, floc sludge is subjected to endogenous partial denitrification to provide nitrate-nitrogen for anammox sludge on the filler, and the purpose of nitrogen removal is finally achieved through anammox. The invention does not require additional carbon source, can realize advanced nitrogen removal of municipal sewage with low C/N ratio, and has the characteristics of energy saving, consumption reduction and the like.

An apparatus for treating municipal sewage by AOA process via endogenous partial denitrification coupled with anammox in anoxic zone, the apparatus comprises a raw water tank (1) for sewage, an AOA reactor (2) and a sedimentation tank (3) which are sequentially connected; wherein the raw water tank (1) for sewage is equipped with an overflow pipe (1.1) and a blow-down pipe (1.2); the raw water tank (1) for sewage is connected to the AOA reactor (2) through an influentinfluent pump (2.1);

the AOA reactor (2) includes eight compartments and is divided into an anaerobic zone (2.2), an aerobic zone (2.3) and an anoxic zone (2.4) according to a direction of water flow, each of the eight compartments has an equal volume, and is equipped with connecting holes cross-connected up and down according to the direction of water flow; the anaerobic zone (2.2) is equipped with an agitator (2.5); the aerobic zone (2.3) is equipped with an air pump (2.6), an aerator (2.7), and a gas flowmeter (2.8); the anoxic zone (2.4) is equipped with an agitator (2.5), a filler frame (2.9); sludge at the bottom of the sedimentation tank (3) is transferred to the anaerobic zone (2.2) through a first sludge reflux pump (3.1) to form a first sludge reflux, transferred to the anoxic zone (2.4) through a second sludge reflux pump (3.2) to form a second sludge reflux, and finally discharged through a drainage pipe (3.3).

The treatment process of municipal sewage in this apparatus is as follows: the sewage first enters the anaerobic zone of the AOA process with endogenous partial denitrification coupled with anammox in the anoxic zone from the raw water tank, the organic matter is stored as an intracellular carbon source in the anaerobic zone, then the mixed liquid enters the aerobic zone, where a nitrification reaction occurs; finally, enters the anoxic zone, where the stored intracellular carbon source is used for partial denitrification reaction, and generated nitrate-nitrogen and ammonia-nitrogen in the mixed liquid is subjected to anammox reaction, finally the purpose of advanced nitrogen removal is achieved.

A method for treating municipal sewage by endogenous partial denitrification coupled with anammox in anoxic zone of AOA process according to the present invention, the method comprises the following:

1) Start-Up Stage of Nitrification and Endogenous Denitrification:

floc sludge is inoculated with nitrification and denitrification sludge, and a filler is anammox filler; the apparatus comprises two kinds of sludge reflux, wherein a reflux ratio $R_1$ of a first sludge reflux to a first compartment of anaerobic zone is equal to 100%, and a reflux ratio $R_2$ of a second sludge reflux to a first compartment of anoxic zone is equal to 100%; during the start-up stage of nitrification and endogenous denitrification, the eight compartments are two anaerobic compartments, three aerobic compartments and three anoxic compartments; the MLSS in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; C/N ratio can be controlled to be greater than 4 by adding an external carbon source; and hydraulic retention time is 16 h; if the intracellular carbon source accumulation rate reaches 90% or above at a last compartment of anaerobic zone, total nitrogen in an effluent from the drainage pipe (3.3) is less than 15 mg/L, which are maintained stably for more than 5 days, the nitrification and endogenous denitrification stage is considered to be successfully started;

2) Start-Up Stage of Endogenous Partial Denitrification Coupled with Anammox:

during start-up stage of endogenous partial denitrification coupled with anammox, an anammox filler frame is added to the anoxic zone; NH4+-N concentration in an effluent from the aerobic zone is controlled by controlling the volume of the aerobic zone; if NH4+-N concentration of a last compartment of aerobic zone is less than or equal to 5 mg/L, the last compartment of the aerobic zone is changed into an anoxic compartment by removing aeration device and adding a stirring device; if NH4+-N concentration of a last compartment of aerobic zone is more than or equal to 10 mg/L, the first compartment of the anoxic zone is changed to an aerobic compartment; if NH4+-N concentration of a last compartment of aerobic zone is in a range from 5 mg/L to 10 mg/L, the eight compartments are maintained as two anaerobic compartments, two aerobic compartments and four anoxic compartments; in this stage, the MLSS in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; a reflux ratio of the first sludge reflux and the second sludge reflux is 100% respectively, and hydraulic retention time is 16 h; if total nitrogen removal reaches more than 50% by the anammox in the anoxic zone, which is maintained stably for more than 10 days, the endogenous partial denitrification coupled with anammox stage is considered to be successfully started;

3) Later Operation Stage:

in a long-term operation, the eight compartments are two anaerobic compartments, two aerobic compartments and four anoxic compartments; the hydraulic retention time is adjusted according to the nitrogen concentration in the effluent: if the total nitrogen concentration in the effluent is less than or equal to 5 mg/L, the hydraulic retention time will be reduced by 2 h, if the total nitrogen concentration in the effluent is more than or equal to 15 mg/L, the hydraulic retention time will be extended by 2 h, if the total nitrogen concentration in the effluent is in a range from 5 mg/L to 15 mg/L, the hydraulic retention time will be maintained at 16 h; the MLSS in the anaerobic zone is 3000-4000 mg/L and aerobic zone and 4000-5000 mg/L in the anoxic zone; and dissolved oxygen in the aerobic zone is controlled to 1-2 mg/L.

Compared with the prior art, the method and the apparatus for treating municipal sewage by AOA process with endogenous partial denitrification coupled with anammox in anoxic zone according to the present invention have the following advantages:

(1) The organic matter in municipal sewage is fully utilized and stored as an intracellular carbon source by GAOs, which reduces the waste of organic matter and saves energy.

(2) Part of ammonia-nitrogen is removed by anammox, which can save aeration amount; the endogenous partial denitrification can provide nitrite-nitrogen for anammox, and meanwhile save carbon sources required for nitrogen removal.

(3) Endogenous denitrification in the anoxic zone can further remove the nitrate-nitrogen generated by anammox, and can stably realize that total nitrogen (TN) concentration in the effluent is less than 5 mg/L, which is an advanced nitrogen removal.

BRIEF DESCRIPTION OF THE DRAWINGS

FIG. 1 is a schematic diagram of an apparatus for treating municipal sewage by AOA process via[4] endogenous partial denitrification coupled with anammox in anoxic zone.

1—raw water tank; 2—AOAO reactor; 3—sedimentation tank; 1.1—overflow pipe of raw water tank; 1.2—blow-down pipe of raw water tank; 2.1—influent pump; 2.2—anaerobic zone; 2.3—aerobic zone; 2.4—anoxic zone; 2.5—agitator; 2.6—air pump; 2.7—aerator; 2.8—gas flowmeter; 2.9—filler frame; 3.1—first sludge reflux pump; 3.2—second sludge reflux pump; and 3.3—drainage pipe.

DETAILED DESCRIPTION

The present invention will be further explained below with reference to the accompanying drawings and embodiment: a method and an apparatus for treating municipal sewage by AOA process via endogenous partial denitrification coupled with anammox in anoxic zone, characterized in that, the apparatus comprises a raw water tank (1) for sewage, an AOA reactor (2) and a sedimentation tank (3) which are sequentially connected; wherein the raw water tank (1) for sewage is equipped with an overflow pipe (1.1) and a blow-down pipe (1.2); the raw water tank (1) for sewage is connected to the AOA reactor (2) through an influent pump (2.1);

the AOA reactor (2) includes eight compartments and is divided into an anaerobic zone (2.2), an aerobic zone (2.3) and an anoxic zone (2.4) according to a direction of water flow, each of the eight compartments has an equal volume, and is equipped with connecting holes cross-connected up and down according to the direction of water flow; the anaerobic zone (2.2) is equipped with an agitator (2.5); the aerobic zone (2.3) is equipped with an air pump (2.6), an aerator (2.7), and a gas flowmeter (2.8); the anoxic zone (2.4) is equipped with an agitator (2.5), a filler frame (2.9); sludge at the bottom of the sedimentation tank (3) is transferred to the anaerobic zone (2.2) through a first sludge reflux pump (3.1) to form a first sludge reflux, transferred to the anoxic zone (2.4) through a second sludge reflux pump (3.2) to form a second sludge reflux, and finally discharged through a drainage pipe (3.3).

Taking septic tank wastewater from a residential area of a university in Beijing as the treatment object, the specific water quality during operation is as follows: COD is 100-250 mg/L, $NH_4^+$ is 30-80 mg/L, $NO_3^-$≤2 mg/L, $NO_2^-$≤0.5 mg/L. The test system is shown in FIG. 1, the effective volume of AOA reactor is 88.48 L, which is divided into eight uniform compartments, each with an effective volume of 11.06 L; the effective volume of the sedimentation tank is 37.2 L, and are made of organic glass.

The specific operations are as follows:

1) Start-Up Stage of Nitrification and Endogenous Denitrification:

floc sludge is inoculated with nitrification and denitrification sludge, and a filler is anammox filler; the apparatus comprises two kinds of sludge reflux, wherein a reflux ratio $R_1$ of a first sludge reflux to a first compartment of anaerobic zone is equal to 100%, and a reflux ratio $R_2$ of a second sludge reflux to a first compartment of anoxic zone is equal to 100%; during the start-up stage of nitrification and endogenous denitrification, the eight compartments are two anaerobic compartments, three aerobic compartments and three anoxic compartments; the MLSS in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; C/N ratio can be controlled to be greater than 4 by adding an external carbon source; and hydraulic retention time is 16 h; if the intracellular carbon source accumulation rate reaches 90% or above at a last compartment of anaerobic zone, total nitrogen in an effluent from the drainage pipe (3.3) is less than 15 mg/L, which are maintained stably for more than 5 days, the nitrification and endogenous denitrification stage is considered to be successfully started;

2) Start-Up Stage of Endogenous Partial Denitrification Coupled with Anammox:

during start-up stage of endogenous partial denitrification coupled with anammox, an anammox filler frame is added to the anoxic zone; ammonia-nitrogen in an effluent from the aerobic zone is controlled by adjusting the volume of the aerobic zone; if $NH_4^+$—N concentration in last compartment of aerobic zone is less than or equal to 5 mg/L, the last compartment of the aerobic zone is changed into an anoxic compartment by removing aeration device and adding a stirring device; if $NH_4^+$—N concentration in last compartment of aerobic zone is more than or equal to 10 mg/L, the first compartment of the anoxic zone is changed to an aerobic compartment; if $NH_4^+$—N concentration in last compartment of aerobic zone is in a range from 5 mg/L to 10 mg/L, the eight compartments are maintained as two anaerobic compartments, two aerobic compartments and four anoxic compartments; in this stage, the MLSS in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; a reflux ratio of the first and second sludge reflux is 100% respectively, and hydraulic retention time is 16 h; if total nitrogen removal reaches more than 50% by the anammox in the anoxic zone, which is maintained stably for more than 10 days, the endogenous partial denitrification coupled with anammox stage is considered to be successfully started;

3) Long-Term Operation Stage:

in a long-term operation, the eight compartments are two anaerobic compartments, two aerobic compartments and four anoxic compartments; the hydraulic retention time is adjusted according to the total nitrogen concentration in the effluent: if the total nitrogen concentration in the effluent is less than or equal to 5 mg/L, the hydraulic retention time will be reduced by 2 h, if the total nitrogen concentration in the effluent is more than or equal to 15 mg/L, the hydraulic retention time will be extended by 2 h, if the total nitrogen concentration in the effluent is in a range from 5 mg/L to 15 mg/L, the hydraulic retention time will be maintained at 16 h; the floc MLSS is 3000-4000 mg/L in the anaerobic zone and aerobic zone and 4000-5000 mg/L in the anoxic zone; and dissolved oxygen in the aerobic zone is controlled to 1-2 mg/L.

The test result shows that after the operation is stable, after municipal sewage passed through the apparatus for treating municipal sewage by AOA process via endogenous partial denitrification coupled with anammox in anoxic zone, COD concentration in the effluent is 45-55 mg/L, and the $NH_4^+$—N concentration is less than 2 mg/L, the concentration of total nitrogen is less than 5 mg/L, and the COD concentration in the effluent, the $NH_4^+$—N concentration, TN and other technical indicators have stably reached the national first level A criteria specified in Discharge Standard of Pollutants for Municipal Wastewater Treatment Plant (GB 18918-2002).

The above are specific embodiments of the present invention. It is convenient for a person skilled in the art to better understand and apply the present invention. The embodiments of the present invention are not limited to the above. Therefore, any simple improvements made to the present invention by a person skilled in the art are all within the scope of the present invention.

The invention claimed is:

1. A method for treating municipal sewage, the method comprising:
  1) obtaining an apparatus that is configured to treat the municipal sewage by an anaerobic/aerobic/anoxic (AOA) process via endogenous partial denitrification coupled with anaerobic ammonium oxidation in an anoxic zone,
  wherein the apparatus comprises a raw water tank for sewage, an AOA reactor and a sedimentation tank which are sequentially connected; wherein the raw water tank for sewage is equipped with an overflow pipe and a blow-down pipe; the raw water tank for sewage is connected to the AOA reactor through an intake pump; the AOA reactor includes eight compartments and is divided into an anaerobic zone, an aerobic zone and the anoxic zone according to a direction of water flow, each of the eight compartments has an equal volume, and is equipped with connecting holes cross-connected up and down according to the direction of water flow; the anaerobic zone is equipped with an agitator; the aerobic zone is equipped with an air pump, an aerator, a gas flowmeter; the anoxic zone is equipped with an agitator, a filler frame; sludge at the bottom of the sedimentation tank is transferred to the anaerobic zone through a first sludge reflux pump to form a first sludge reflux, transferred to the anoxic zone through a second sludge reflux pump to form a second sludge reflux, and finally discharged through a drainage pipe;
  2) utilizing the apparatus to perform a start-up stage of nitrification and endogenous denitrification,
  wherein floc sludge is inoculated with nitrification and denitrification sludge, and a filler is anammox filler; wherein a reflux ratio $R_1$ of the first sludge reflux to a first compartment of the anaerobic zone is equal to 100%, and a reflux ratio $R_2$ of the second sludge reflux to a first compartment of the anoxic zone is equal to 100%; during the start-up stage of nitrification and endogenous denitrification, the eight compartments are two anaerobic compartments, three aerobic compartments and three anoxic compartments; mixed liquid suspended solids (MLSS) in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; C/N ratio is controlled to be greater than 4 by adding an external carbon source; and hydraulic retention time is 16 h; if an intracellular carbon source storage rate reaches 90% or above in a last compartment of the anaerobic zone, total nitrogen in an effluent from the drainage pipe is less than 15 mg/L, which are maintained stably for more than 5 days, the nitrification and endogenous denitrification stage is considered to be successfully started;

3) utilizing the apparatus to perform a start-up stage of endogenous partial denitrification coupled with anammox, wherein during start-up stage of endogenous partial denitrification coupled with anammox, an anammox filler frame is added to the anoxic zone; ammonia-nitrogen in an effluent from the aerobic zone is controlled by adjusting a volume of the aerobic zone; if $NH_4^+$—N concentration in a last compartment of the aerobic zone is less than or equal to 5 mg/L, the last compartment of the aerobic zone is changed into an anoxic compartment by removing the aerator and adding a stirring device; if $NH_4^+$—N concentration in the last compartment of the aerobic zone is more than or equal to 10 mg/L, the first compartment of the anoxic zone is changed to an aerobic compartment; if $NH_4^+$—N concentration in the last compartment of the aerobic zone is in a range of 5 mg/L to 10 mg/L, the eight compartments are maintained as two anaerobic compartments, two aerobic compartments and four anoxic compartments; in this stage, the MLSS in the anaerobic zone and aerobic zone is maintained at 3000-4000 mg/L and the MLSS in the anoxic zone is maintained at 4000-5000 mg/L; dissolved oxygen in the aerobic zone is controlled to 1-2 mg/L; a reflux ratio of the first and second sludge reflux is 100% respectively, and hydraulic retention time is 16 h; if total nitrogen removal reaches more than 50% by the anammox in the anoxic zone, which is maintained stably for more than 10 days, the endogenous partial denitrification coupled with anammox stage is considered to be successfully started; and 4) utilizing the apparatus to perform a long-term operation stage, wherein in a long-term operation, the eight compartments are two anaerobic compartments, two aerobic compartments and four anoxic compartments; the hydraulic retention time is adjusted according to a total nitrogen concentration in the effluent: if the total nitrogen concentration in the effluent is less than or equal to 5 mg/L, the hydraulic retention time is reduced by 2 h, if the total nitrogen concentration in the effluent is more than or equal to 15 mg/L, the hydraulic retention time is extended by 2 h, if the total nitrogen concentration in the effluent is in a range from 5 mg/L to 15 mg/L, the hydraulic retention time is maintained at 16 h; the floc MLSS is 3000-4000 mg/L in the anaerobic zone and aerobic zone and 4000-5000 mg/L in the anoxic zone; and dissolved oxygen in the aerobic zone is controlled to 1-2 mg/L.

\* \* \* \* \*